United States Patent Office 3,796,781
Patented Mar. 12, 1974

3,796,781
EXTRUSION PROCESS
William Joseph Edwards and James Jack, Manningtree, England, assignors to Bakelite Xylonite Limited, London, England
Filed July 20, 1971, Ser. No. 164,341
Claims priority, application Great Britain, July 21, 1970, 35,301/70
Int. Cl. B29c 25/00; B29d 23/04
U.S. Cl. 264—89
15 Claims

ABSTRACT OF THE DISCLOSURE

A process for quenching a continuously extruded tube of polymeric material in which the tube is quenched externally in a quenching bath and is simultaneously quenched internally by passing quenching liquid into and removing it from the interior of the tube, the tube passing over and the internal quenching liquid passing through an assembly of two or more calibrating discs.

---

This invention relates to a process and apparatus for the production of tubes from organic thermoplastic polymeric materials.

Various processes for the production of tubes from organic thermoplastic polymeric materials are known which involve a quenching process. British Pats. 1,059,346 and 1,102,078 have described processes for the production of a quenched tube of isotactic polypropylene which comprise extruding a tube of polypropylene downwardly over a former comprising at least two separate discs laying at right angles to the axis of the tube with said former being within a tubular sleeve situated below the surface of a quenching liquid, and passing the quenching liquid downward through said sleeve whereby there is suitable reduction of the temperature of the polypropylene tube. British Pat. 1,106,994 has described a process for the manufacture of biaxially orientated thermoplastic film which comprises extruding a tube of thermoplastic material from an extrusion die in association with which are provided means for preventing an inflation pressure from rupturing the tube, drawing off the tube from the die by means of a pair of nip rollers which flatten the tube across only a part of its width and then later inflating the tube at an appropriate temperature to stretch and biaxially orientate the material of the tube. If desired, the extruded tube of the process of British Pat. 1,106,994 may be quenched prior to its passage through the nip rollers by passing it through a quenching bath and/or by circulating a quenching fluid through the interior of the tube.

According to this invention, there is provided a process for quenching a continuously extruded tube of organic thermoplastic polymeric material which comprises leading the tube from the die of an extrusion machine vertically downward into a quenching bath while bathing the inner surface of said tube with a quenching liquid which is circulated through said tube by feeding liquid continuously into the tube said liquid rising in the tube and passing continuously through an assembly of two or more calibrating discs which are disposed perpendicularly to the axis of the tube and which are mutually coaxial with each other as well as with the extruded tube and which discs are so shaped and assembled together as to prevent the formation of stagnant regions in the liquid, to a selected level lying above the uppermost level of the assembly of calibrating discs and withdrawing said liquid by suction means which maintains said liquid at said selected level, and which comprises causing the tube to change its direction of travel from a vertically downward direction to an upward direction of travel in the quenching bath after it has passed through a pair of nip-rollers which flatten the tube across only part of its width and driving or drawing the tube from the quenching bath to a point where it is batched or is subjected to additional treatment.

Further, the invention provides apparatus for the continuous production of a quenched tube of organic thermoplastic polymeric material, comprising a downwardly operating extrusion die, a quenching bath, an assembly of calibrating discs which are disposed perpendicularly to the axis of the tube and which are mutually coaxial with each other as well as with the axis of the tube and which assembly is supported by a tubular structure attached to and passing through the mandrel of the extrusion die, means for passing quenching liquid continuously through the tubular structure into the interior of the tube at a level below that of the lowermost of the calibrating discs, suction means for continuously removing this liquid at a selected level above the uppermost level of the assembly of calibrating discs, means for controlling a gas pressure in the space enclosed by the die, the thermoplastics tube and the surface of the quenching liquid, a pair of nip-rollers which flatten the tube across only part of its width and which enable the direction of travel of the tube to be changed from a vertically downward direction to an upward direction of travel in the quenching bath and means for taking the tube from the quenching bath to a point where it is batched or is subjected to additional treatment.

Generally the tubes produced have circular cross-section and the present invention is described in terms of such tubes. It must, however, be appreciated that this invention can be readily adapted to the production of tubes of different cross-sectional shapes.

Any standard extrusion apparatus can be used in the process of the present invention. The extrusion die on this apparatus should be arranged so that the direction of travel of the extruded tube is vertically downwards. In some cases, it is advantageous to have the diameter of the quenched tube slightly smaller than that of the extruded tube.

The molten extruded tube is fed over an assembly of two or more calibrating discs which control the inner shape of the tube. A quenching liquid is passed continuously through the assembly with its flow being controlled by the disposition of the components of the assembly so that the inner surface of the vertically-moving tube is continuously bathed with said quenching liquid. The quenching liquid is arranged to pass over the calibrating discs so that there is a film of liquid between the outermost periphery of each calibrating disc and the internal surface of the tube passing over it. It is necessary for the assembly of calibrating discs to be so machined that there are no stagnant regions within the liquid which is effectively cooling the tube. The existence of such stagnant regions would lead to nonuniform quenching of the tube and thus give nonuniform macromolecular structure of the organic thermoplastics polymeric material of which it is composed. Such inhomogeneity would give undesirable behaviour of the tube in subsequent use. In an extreme case of stagnancy of the liquid, boiling of the liquid could occur with deleterious effects on the surface of the tube wall as well as introducing inhomogeneity of properties of the tube. The arrangements of liquid flow in both the quenching bath and within the thermoplastics tube itself must be such that no boiling of liquid occurs. If this is not the case, gross inhomogeneity of properties of the quenched tube will result.

The assembly of calibrating discs preferably comprises a number of calibrating discs with a baffle-disc being disposed on one, or both, sides of each calibrating disc. The baffle-discs prevent the formation of any stagnant regions in the quenching liquid which flows through and over the assembly and effectively cools the tube. The distance between the first and last of the calibrating discs is so arranged that adequate quenching of the thermoplastics tube is assured. The number of calibrating discs incorporated in an assembly can be varied, but it is generally preferred to use as few as is consistent with adequate support of the tube during quenching. Generally at least three calibrating discs will be employed in conjunction with three baffle-discs with the uppermost of the calibrating discs being surmounted by a fourth baffle discs. It is also preferred that each of the calibrating discs shall be as thin as is consistent with adequate support of the thermoplastics tube and thus the area of the discs which functions as a support means for the thermoplastics tube is kept as small as possible. The area of this support means can be kept as small as possible by bevelling the periphery of the discs.

The calibrating discs and/or baffle discs can be made from a wide range of materials, preferably metals or filled or unfilled fluorinated plastics materials. The choice of material is governed by its mechanical strength and resistance to corrosion. We have found stainless steel or brass to be suitable metals and polytetrafluorethylene or polychlorotrifluoroethylene to be suitable plastics materials when using water as the quenching liquid. The diameter of the calibrating disc is selected to provide the appropriate internal diameter of the thermoplastics tube. Holes are drilled in each disc so that the quenching liquid can flow through the discs. The holes are preferably drilled as near as possible to the edge of the disc so as to promote the flow of the quenching fluid in regions adjacent to the interior surface of the thermoplastics tube as it passes over the assembly of calibrating discs. The baffle discs are machined so as to have diameters substantially smaller than those of the calibrating discs. They are also machined to a shape which promotes continuous flow of the quenching liquid through the assembly.

Although it is often convenient to have separate calibrating discs and separate baffle-discs which are assembled to form what has been described as an "assembly of calibrating discs," it will be appreciated that it may be possible to machine the entire assembly from a suitable block of material. Such a "solid" assembly of calibrating and baffle-discs simplifies storage of the assemblies and expedites changes of the assemblies when production requirements call for changes of diameter of the thermoplastics tube.

The assembly of calibrating discs is mounted on a tubular structure which is attached to the mandrel of the die from which the thermoplastics tube is extruded. The tubular structure comprises two concentric tubes. Quenching liquid is passed down the inner of these tubes and emerges at a level below the assembly of calibrating discs. As the tube fills the liquid rises and passes through and over the assembly to a selected level which is above the uppermost calibrating disc and is then withdrawn by suction means through holes in the wall of the outer of the two concentric tubes and is withdrawn through the annular space between the two concentric tubes.

In addition to being quenched internally by the quenching liquid in the manner outlined above, the thermoplastics tube is also quenched externally by passing into and through a quenching bath. This may be a simple liquid bath, but is preferably a quenching system as described in British Pat. No. 1,102,078 in which there is provided a sleeve which surrounds the thermoplastics tube over part of its length which is submerged in the quenching bath and through which the quenching liquid circulates.

The thermoplastics tube passes vertically downwards in the bath. In the process of the invention the direction of travel of the tube is changed by passing it through a pair of nip-rollers situated at a level below the end of the tubular structure on which the assembly of calibrating discs is mounted. After passage through the nip-rollers, which flatten the tube across only part of its width, the tube is taken in an upwards direction, at a suitable angle to the vertical, from the quenching bath to a point where it may be batched or subjected to additional treatment. The result of the use of nip-rollers which do not flatten the tube across its entire width is that the tube is filled with the quenching liquid from a point at the selected level above the assembly of calibrating discs to a point corresponding substantially with the point at which the tube emerges from the quenching bath. We have found that this filling of the thermoplastics tube with the quenching liquid over substantially the whole of its path through the quenching bath confers the advantage of easier converging of the tube as it passes to the nip rollers because there is no need to balance internal gaseous pressures and external liquid pressures as is the case with previous systems.

The diameter of the thermoplastics tube after it leaves the die is controlled by controlling the gas pressure in the space over the surface of the quenching liquid in the thermoplastics tube. We have found it preferable to control this pressure by arranging for a flow of gas through said space. The required pressure within the space may be achieved by suitable valve control on tubes which lead the gas to and from the space which is, of course, that enclosed by the die, the thermoplastics tube and the surface of the quenching liquid lying above the assembly of calibrating discs. The pressure employed controls the difference between the water level above the assembly and the water level in the tube where it leaves the quenching bath. The quenching liquid in the thermoplastics tube behaves virtually as a U-tube manometer and gives a useful indication of the stability of the suction and pressure means used in the process. It will be appreciated that automatic or semi-automatic control of pressure conditions within this particular space within the tube can be achieved by the employment of suitable proximity-sensitive devices. Such control is a valuable adjunct in the running of production processes. The gas employed in the process of the invention should not react appreciably with the thermoplastics material or with the apparatus used in the process. We preferably use air as the gas.

The liquids employed as quenching liquid within the tube and as the liquid used in the quenching bath can be any liquid which does not attack the thermoplastic material or the materials used for constructing the apparatus used in the process of the invention. The liquid must also have suitable thermal properties, e.g. freezing point, boiling point, specific heat. Water is preferred in most cases. It may be preferable that the liquid used as the quenching liquid within the thermoplastics tube is deaerated prior to its being used in the process of this invention. This avoids the formation of air bubbles which prevent uniform quenching of the thermoplastics tube.

The process of this invention can be used for a wide range of organic thermoplastic polymeric materials, for example, polyethylene terephthalate, and copolyesters of isophthalic and terephthalic acids with a glycol; vinylidene chloride polymers and copolymers; polyvinyl chloride, polyamides, for example, nylon; polyformaldehyde and its copolymers; polystyrene; polyolefins, for example, polyethylene and especially polypropylene.

The process and the apparatus will now be described in greater detail, by way of example, with reference to the drawings accompanying this specification in which.

Figure 1:
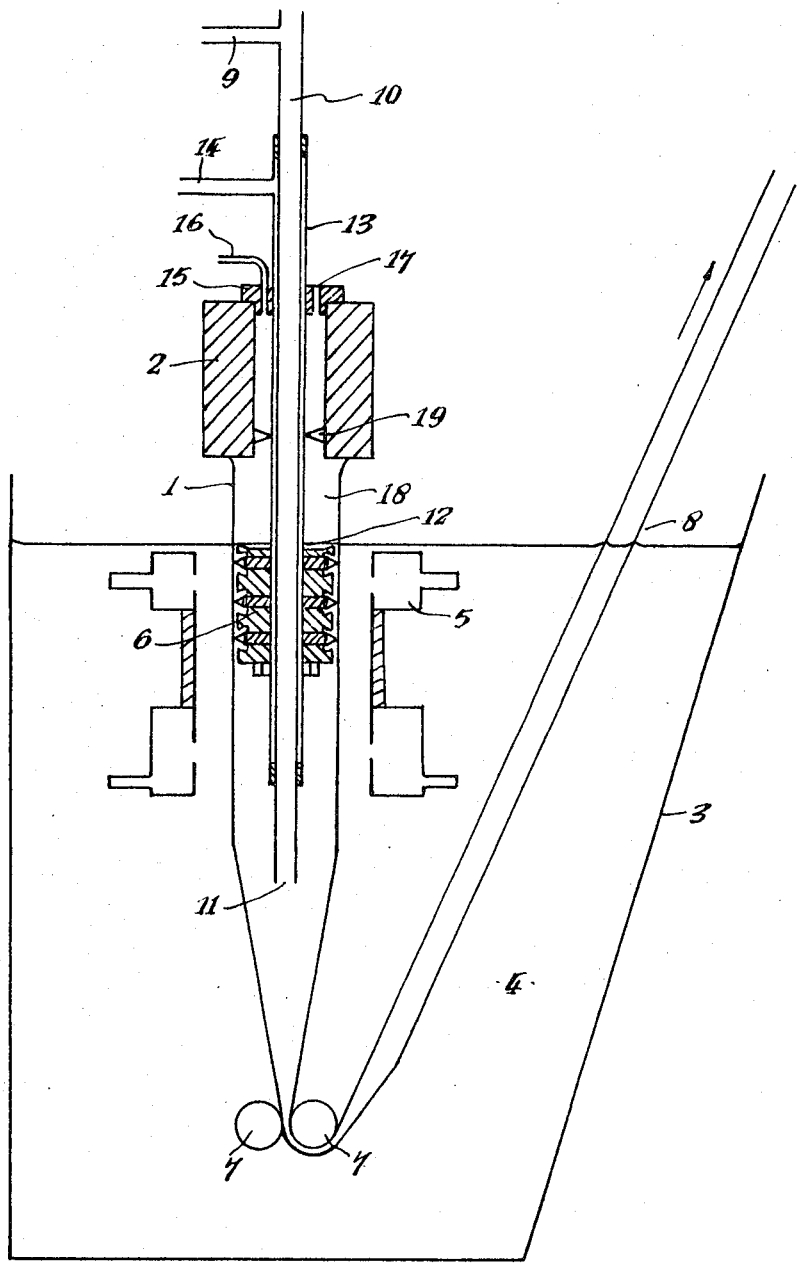
FIG. 1 is a sketch showing a section through one form of the apparatus.

Referring to FIG. 1, a thermoplastics tube 1 is extruded from a die 2 which is fed by a suitable extrusion machine. The hot tube 1 proceeds vertically downwards into quenching liquid 4 contained in the quench bath 3. Surrounding the tube 1 is sleeve 5 through which liquid is pumped to provide a moving stream of liquid passing over the outer surface of the tube 1. Such water is passed back into sleeve 5. The means for effecting this passage of liquid from and to the sleeve 5 is not shown. The sleeve 5 can be of the type described in British Pat. No. 1,102,078. The tube 1 passes vertically downwards over an assembly 6 of calibrating discs to a pair of nip rollers 7 which flatten the tube over only a part of its width and is then taken upwards to emerge from the quenching liquid 4 and point 8. The assembly 6 of calibrating discs is mounted on a tube 13 within which is fixed a second tube 10. Sealing means are provided to close, at each end of tube 10, the annulus formed by the two tubes 10 and 13 which are arranged to be concentric.

Figure 2:
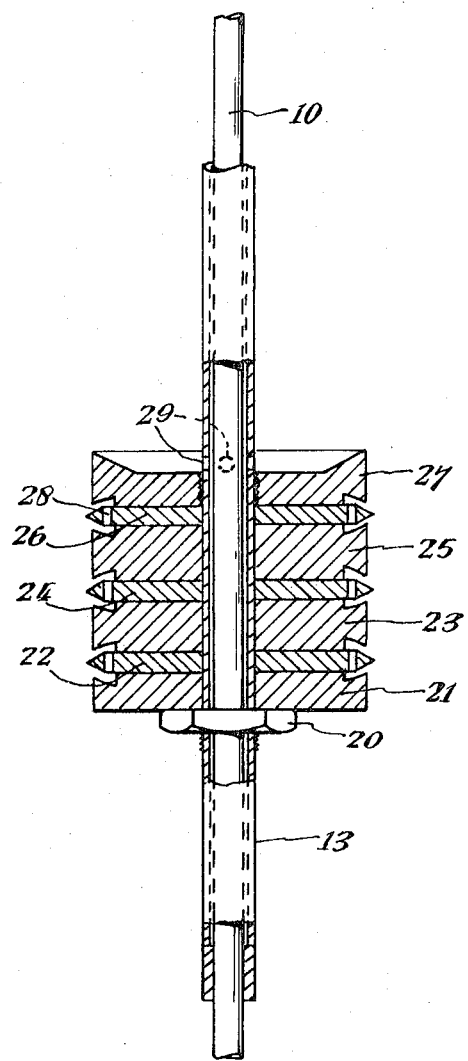
FIG. 2 is a sketch of an enlarged sectional view of the assembly of calibrating discs shown in FIG. 1.

Referring to FIG. 2, the assembly 6 of calibrating discs comprises a nut 20 in threaded engagement with tube 13. Tube 13 passes coaxially through an alternating sequence of baffle-discs and calibrating discs. 21, 23, 25 and 27 are baffle-discs. 22, 24 and 26 are calibrating discs which each have a number of holes 28 circumferentially disposed near their peripheries. The baffles and the calibrating discs 21 to 26 are clamped together by means of a further baffle disc 27 which is in threaded engagement with tube 13 and cooperates with nut 20. Holes 29 are positioned at four equally spaced points around the periphery of tube 13 just above the horizontal top surface of baffle disc 27.

Quenching liquid can be fed to tube 10 by means of tube 9. Tube 14 which is connected to tube 13 is connected to a suction means so that quenching liquid can be drawn through the annular space between 10 and 13 after passing through the holes 28 in the wall of tube 13. Quenching liquid passing down tube 10 emerges at the open end 11 and then fills the tube 1 as shown in FIG. 1. The internal filling of the length of tube 1 in the portion of its length within the quenching bath with quenching liquid is made possible because the tube 1 is only flattened across part of it width. The nonflattened portions enable the quenching liquid to get into the upwardly rising portion of tube 1. The tubular assembly comprising tubes 10 and 13 is mounted on the upper face of die 2 by means of a plug 15 which is hermetically sealed to die 2. The tubular assembly is set coaxially with the tube 1 by means of screws 19. A tube 16 passes through plug 15 which is also provided with a vent-hole 17. Gas can be blown through tube 16 and suitable valving arrangements (not shown) are used to control the flow of gas through vent-hole 17 and thus the pressure in the gas space 18.

The following example illustrates the preparation of a quenched tube of polypropylene by the process of the invention and its use in the production of polypropylene film.

A tube of polypropylene resin (Grade PXC3391 as manufactured and sold by I.C.I. Limited) was extruded from a 2 inch annular extrusion die fed by a 2 inch screw extruder working at an output rate of 40 to 45 lb./hour. The temperature of the tube as it left the die was approximately 200° C.

The extruded tube was quenched by passage through the apparatus as described with specific reference to the drawings, the following conditions prevailing:

| | |
|---|---|
| Internal quench liquid | Water. |
| Temperature | 50° F. |
| Flow-rate through and over calibrating discs | 2.5 gals./min. |
| External quench liquid | Water. |
| Temperature | 50° F. |
| Flow-rate through sleeve | 2 to 3 gals./min. |
| Diameter of calibrating discs | 1¾ inches. |
| Inside diameter of sleeve | 2½ inches. |
| Quench nip rollers speed | 16 ft./min. |
| Quenched tube wall thickness | 18 to 20 thou. |

The level of the quenching liquid in the tube was arranged such that the uppermost peripheral region of the top baffle disc acted as a weir, over which the quenching liquid poured prior to being withdrawn by suction.

The quenched tube thus produced was then subjected to a conventional bubble blowing process to convert it into a balanced biaxially oriented polypropylene film. The film produced had a surface gloss and clarity much superior to that produced from a tube which had been subjected only to a quench on one side. In addition, the improved homogeneity of the polypropylene of the quenched tube resulting from the efficient quenching via both internal and external surfaces, gave rise to a much more stable bubble during the blowing process and therefore to a film of more uniform gauge.

We claim:
1. A process for quenching a continuously extruded tube of organic thermoplastic polymeric material which comprises the steps of leading the tube from the die of an extrusion machine vertically downward around an assembly of a plurality of calibrating discs which are positioned coaxially of said tube and perpendicular to the axis thereof into a quenching bath, while bathing the inner surface of said tube with a quenching liquid which is circulated through said tube by first forming a body of liquid in contact with said inner surface beneath said assembly, causing the liquid in said body to rise in a continuous column within said tube to a selected level lying above the top of said assembly while remaining in contact with said inner surface between the discs of said assembly and at said selected level above said assembly, and withdrawing said liquid upwardly from a point above said assembly by suction means which maintains said liquid at said selected level, causing said tube to change its direction of travel from a vertically downward direction to an upward direction of travel in the quenching bath after it has passed through a pair of nip-rollers which flatten the tube across only part of its width, and withdrawing the tube from the quenching bath.

2. A process as claimed in claim 1, wherein the extruded tube is of circular cross-section.

3. A process as claimed in claim 1, wherein the assembly of calibrating discs comprises a number of calibrating discs with a baffle disc on one or both sides of each calibrating disc.

4. A process as claimed in claim 3, wherein the assembly of calibrating discs comprises at least three calibrating discs and at least four baffle discs.

5. A process as claimed in claim 1, wherein the calibrating discs are as thin as is consistent with adequate support of the thermoplastics tube.

6. A process as claimed in claim 1, wherein the calibrating discs and/or baffle discs are made of metal or of a filled or unfilled fluorinated plastics material.

7. A process as claimed in claim 1, wherein the quenching liquid is water and the calibrating discs and/or baffle discs are made from brass, stainless steel, polytetrafluorethylene or polychlorotrifluoroethylene.

8. A process as claimed in claim 1, wherein holes are drilled in each calibrating disc as near as possible to the edge of the disc.

9. A process as claimed in claim 1, wherein the assembly of calibrating discs and baffle discs are machined from a single block of material.

10. A process as claimed in claim 1, wherein the external quenching system is a system in which there is provided a sleeve which surrounds the thermoplastics tube over a part of its length which sleeve is submerged in the quenching bath and through which the quenching liquid is caused to circulate.

11. A process as claimed in claim 1, wherein the gas pressure within the space bounded by the surface of the quenching liquid in the tube, the tube walls and the extrusion die is controlled by providing a controlled flow of gas through said space.

12. A process as claimed in claim 1, wherein the liquid used for the internal quenching is deaerated prior to its introduction into the tube.

13. A process as claimed in claim 1, wherein the thermoplastic polymeric material of the tube is polyethylene terephthalate, a copolyester of isophthalic and terephthalic acid with a glycol and vinylidene chloride polymers or copolymers, polyvinyl chloride, a polyamide, a polymer or copolymer of formaldehyde, a polystyrene or polyolefin.

14. A process as claimed in claim 1, wherein the thermoplastic polymeric material of the tube is polypropylene.

15. Apparatus for the continuous production of a quenched tube of organic thermoplastic polymeric material, comprising a downwardly operating extrusion die, a quenching bath, an assembly of calibrating discs which are disposed perpendicularly to the axis of the tube and which are mutually coaxial with each other as well as with the axis of the tube and which assembly is supported by a tubular structure attached to and passing through the mandrel of the extrusion die, means for passing quenching liquid continuously through the tubular structure into contact with the inner surface of the tube at a level below that of the lowermost of the calibrating discs, suction means for continuously drawing the same liquid upwardly as a continuous column within said tube to a selected level above the uppermost level of the assembly of calibrating discs while maintaining said liquid in contact with the wall of said tube between said discs and for removing said liquid upwardly from said selected level, means for controlling a gas pressure in the space enclosed by the die, the thermoplastics tube and the surface of the quenching liquid, a pair of nip-rollers which flatten the tube across only part of its width and which enable the direction of travel of the tube to be changed from a vertically downward direction to an upward direction of travel in the quenching bath and means for taking the tube from the quenching bath to a point where it is batched or is subjected to additional treatment.

References Cited

UNITED STATES PATENTS

| | | | |
|---|---|---|---|
| 3,108,324 | 10/1963 | Zavasnik | 264—209 |
| 2,814,071 | 11/1957 | Allan et al. | 264—95 |
| 3,385,918 | 5/1968 | Jack et al. | 264—95 |
| 3,284,552 | 11/1966 | Haley | 264—209 |
| 3,012,276 | 12/1961 | Given | 264—209 |
| 3,655,846 | 4/1972 | Kanoh et al. | 264—95 |
| 3,532,780 | 10/1970 | Kakutani et al. | 264—95 |

FOREIGN PATENTS

| | | | |
|---|---|---|---|
| 1,106,994 | 3/1968 | Great Britain | 264—95 |
| 1,059,346 | 2/1967 | Great Britain | 264—95 |

ROBERT F. WHITE, Primary Examiner

J. R. THURLOW, Assistant Examiner

U.S. Cl. X.R.

264—95, 178R, 209, 237, DIGEST 78; 425—71, 326 R